Patented Aug. 17, 1937

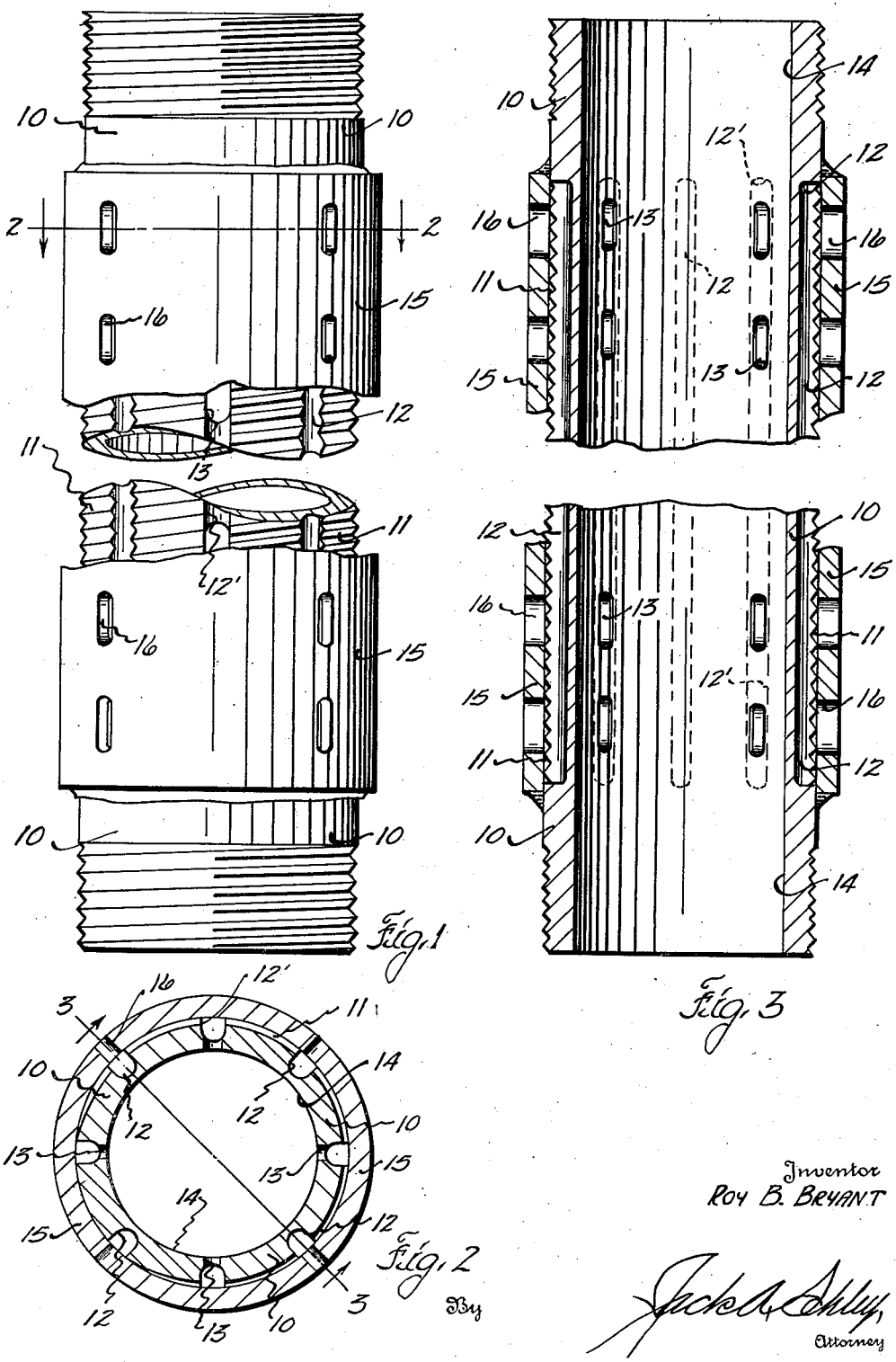

2,090,180

UNITED STATES PATENT OFFICE 2,090,180

WELL SCREEN

Roy B. Bryant, Dallas, Tex.

Application October 8, 1936, Serial No. 104,577

8 Claims. (Cl. 166—5)

This invention relates to new and useful improvements in well screens.

One object of the invention is to provide an improved well screen which is adapted to be connected to the lower end of the well casing for filtering the fluid entering said casing.

An important object of the invention is to provide an improved well screen which is so constructed that the fluid passing therethrough will be distributed evenly throughout the screening structure, whereby the flow is not concentrated through one or more restricted openings, and the danger of the structure being cut out or damaged by the action of abrasives or corrosives present in the fluid flowing therethrough is substantially eliminated.

Another object of the invention is to provide an improved well screen which is so constructed that the fluid entering the screening structure is directed into restricted passages which divide the flow into numerous small streams, whereby the flow of each stream is sufficient to prevent accumulation or deposits of solids or other extraneous matter in the passages, thereby making the screen self cleaning.

A further object of the invention is to provide an improved well screen including a screen body having openings therethrough and an external protective sleeve carried by the screen body having openings offset from the openings in said body, and a plurality of passages connecting the openings in the sleeve with the openings in the screen body; said passages being of such size that they perform the screening operation, and being protected by the sleeve from the initial action of the fluid flowing through the screen, whereby danger of the screen being cut out or damaged by the action of abrasives present in the fluid flowing therethrough is substantially eliminated and the filtering efficiency of the screen is increased.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a view partly in elevation and partly in section of a well screen constructed in accordance with the invention, Figure 2 is a horizontal, cross-sectional view taken on the line 2—2 of Figure 1, and Figure 3 is a transverse, vertical, sectional view taken on the line 3—3 of Figure 2.

In the drawing, the numeral 10 designates an elongate tubular body which is externally screw-threaded at its upper end, whereby it may be connected to a well casing (not shown). The lower end of the body is also externally screw-threaded, whereby additional lengths of well screen, casing or a cap (not shown) may be connected.

The body 10 is provided with comparatively coarse or large external screw-threads 11, which extend throughout substantially the vertical length of the body, terminating at a point from the ends thereof, as is clearly shown in Figure 3. Elongate longitudinal grooves 12 are formed in the body, extending throughout the screw-threaded portion 11, and are preferably located equidistant around the outer periphery of the body. Each alternate groove 12' has a plurality of radial slots 13, which extend through the body, connecting such alternate groove with the bore 14 of the tubular body whereby communication is established between the screw-threaded exterior 11 and said bore.

An external cylindrical protective sleeve 15 encircles the body 10 and is of such length that its ends extend beyond the screw-threaded portion 11 of said body. The ends of the sleeve are welded, or otherwise secured to the body, whereby the sleeve is fixed on said body. A plurality of radial openings 16 are provided in the wall of the sleeve, extending entirely therethrough. The openings are grouped, with the openings of each group being located in vertical alinement, and each group is so spaced from the next group that, when the sleeve is in position, each group is in alinement with one of the grooves 12. It is noted that the openings 16 are in registration with every alternate groove, and the grooves with which the openings register are those which do not have direct communication with the bore 14 of the body through the slots 13, as is clearly shown in Figure 2. It is further noted that the screw-threaded portion 11 of the body is covered by the sleeve and in conjunction therewith forms a plurality of restricted passages connecting the grooves 12 and 12'. With this arrangement, fluid flowing through the openings 16 in the sleeve enters the grooves 12 and then flows along the restricted passages formed by the screw threads 11 to those grooves 12' provided with the slots 13. From these grooves the fluid flows through the slots into the interior of the body.

When the well screen has been placed in a well, the fluid will enter the openings 16 in the external sleeve and travel vertically along the grooves 12, which are in registration with said openings. The grooves, being comparatively large, will permit the fluid to spread immediately and evenly throughout the passages formed by the coarse screw-threads 11. The fluid will then pass along said passages into the next adjacent grooves 12', which grooves have the slots 13 extending therefrom, and then through said slots into the bore 14 of the screen body, from which it may pass upwardly to the surface.

It is noted that, by spreading the fluid entering the screen evenly throughout the numerous passages formed by the screw-threaded portion, the flow of the fluid is not concentrated along a single path and subsequent cutting out or damage of the screen is substantially eliminated, since the screening action is performed by the passages formed by the screw-threads. It is further noted that cutting out of the openings 16 in the sleeve and also erosion of the grooves 12, in registration with said openings, due to abrasives in the fluid flowing therethrough, will not materially affect the efficiency of the screen, since the passages formed by the screw-threads perform the screening operation; and, since said passages are covered and therefore protected from the initial action of the fluid, damage thereto due to abrasives in the fluid flowing therethrough is substantially eliminated.

Due to the comparatively small size of the restricted passages formed by the screw-threads 11, the velocity of the fluid flowing therethrough is sufficient to prevent the solids or other extraneous matter in the fluid from accumulating or being deposited in said passages, whereby the screen is made self cleaning, and clogging thereof is substantially eliminated.

While the passages between the grooves 12 and 12' have been described as being formed by coarse screw-threads, it is understood that said passages need not be spiral and may be formed in any suitable manner, as by cutting annular serrations in the body.

Since the well screen is formed of only two pieces, which are securely fixed together, a simple structure is formed which is substantially as indestructible as the casing to which it is attached, and which performs the screening operation efficiently for substantially the life of the well.

What I claim and desire to secure by Letters Patent, is:

1. A well screen including, an elongate tubular body adapted to be connected to a well casing and having fluid passages formed on its surface, said body also being formed with grooves which communicate with said passages, means for establishing communication between a portion of the grooves and the interior of the body, and a cylindrical sleeve surrounding the body and having openings therein in registration with a portion of the grooves in said body, not having communication with the interior thereof whereby fluid may flow into the grooves and then to the fluid passages.

2. A well screen including, an elongate tubular body, coarse serrations on the body forming fluid passages, said body having grooves in its surface which communicate with the passages, there being openings in the body in registration with a portion of the grooves, whereby a communication is established between such grooves and the interior of the body, and a sleeve surrounding the body and covering the serrations and grooves and having a plurality of openings in registration with those grooves which are not in registration with the openings leading to the interior of the body.

3. A well screen including, an elongate tubular body adapted to be connected to a well casing and having annular fluid passages formed on its surface, said body also being formed with longitudinal grooves which extend across said passages, means for establishing communication between some of the grooves and the interior of the body, and a cylindrical sleeve surrounding the body and having openings therein in registration with a portion of the grooves in said body not having communication with the interior thereof whereby fluid may flow into the grooves and then to the fluid passages.

4. A well screen including, an elongate tubular body, coarse serrations on the body forming annular fluid passages, said body having longitudinal grooves in its surface crossing the passages and communicating therewith, there being openings in the body in registration with a portion of the grooves, whereby a communication is established between such grooves and the interior of the body, and a sleeve surrounding the body and covering the serrations and grooves and having a plurality of openings in registration with those grooves which are not in registration with the openings leading to the interior of the body.

5. A well screen including, an elongate tubular body adapted to be connected to a well casing and having fluid passages formed on its surface and covering substantially the whole thereof, said body also being formed with grooves which communicate with said passages, means for establishing communication between a portion of the grooves and the interior of the body, and a cylindrical sleeve surrounding the body and having openings therein in registration with a portion of the grooves in said body, not having communication with the interior thereof whereby fluid may flow into the grooves and then to the fluid passages.

6. A well screen including, an elongate tubular body adapted to be connected to a well casing and having fluid passages formed on its surface and covering substantially the whole thereof, said body also being formed with grooves which communicate with said passages, means for establishing communication between some of the grooves and the interior of the body, and a cylindrical sleeve surrounding the body and covering the passages and grooves and having a plurality of openings therein in registration with a portion of the grooves in said body, not having communication with the interior thereof whereby fluid may flow into the grooves and then to the fluid passages.

7. A well screen including, an elongate tubular body adapted to be connected to a well casing and having annular fluid passages formed on its surface, said body also being formed with longitudinal grooves which communicate with said passages, there being openings in the body in registration with a portion of the grooves whereby a communication is established between such grooves and the interior of the body, and a cylindrical sleeve surrounding the body and having openings therein in registration with those grooves which are not in registration with the openings leading to the interior of the body.

8. A well screen including, an elongate tubular body having coarse external screw-threads provided thereon, said body also being formed with longitudinal grooves which communicate with said screw-threads, means for establishing communication between some of the grooves and the interior of the body, and a sleeve surrounding the body and engaging the outer surface of the body whereby each thread forms an individual fluid passage, said sleeve having openings therein in registration with those grooves in the body not having communication with the interior of said body whereby fluid may enter the openings, pass along the fluid passages and enter the interior of the body.

ROY B. BRYANT.